United States Patent [19]

Peddinghaus

[11] Patent Number: 4,676,700
[45] Date of Patent: Jun. 30, 1987

[54] DRILLING APPARATUS FOR BORING AN ARRAY OF HOLES IN A WORKPIECE

[76] Inventor: Rolf Peddinghaus, Deterbergerstrasse 25, 5828 Ennepetal, Fed. Rep. of Germany

[21] Appl. No.: 819,540

[22] Filed: Jan. 16, 1986

[30] Foreign Application Priority Data

Jan. 16, 1985 [DE] Fed. Rep. of Germany ....... 3501231

[51] Int. Cl.$^4$ ............................................. B23B 41/00
[52] U.S. Cl. ......................................... 408/10; 408/88
[58] Field of Search ...................... 408/1, 2, 3, 10, 16, 408/26, 88, 46, 4; 29/26 A

[56] References Cited

U.S. PATENT DOCUMENTS 4,108,564  8/1978  Peddinghaus et al. ............... 408/10

*Primary Examiner*—Z. R. Bilinsky
*Attorney, Agent, or Firm*—Karl F. Ross; Herbert Dubno

[57] ABSTRACT

An apparatus for drilling a large profile workpiece has a support fixable relative to the workpiece, a drill arbor centered on an axis intersecting the workpiece, a bit coaxially carried on the arbor, and a drive connected to the arbor for advancing the bit toward the workpiece either at a relatively fast advance speed or at a relatively slow boring speed. A guide element displaceable in the support parallel to the axis is secured by a compression spring to the arbor for joint movement parallel to the axis with a predetermined limited lost-motion stroke, in other words, the arbor and element can only move relative to each other through this stroke. A switch carried on the element and a switch operator carried on the arbor control axial movement of the arbor along with an abutment carried on the element and a stop on the support engageable with the abutment that define an outer position for the guide element and arbor. Thus the guide element is prevented by engagement of the abutment on the stop from moving further away from the workpiece than the outer position. A clamping device is provided on the support for arresting the guide element thereon, to that, when the guide element is arrested on the support, the axial stroke of the arbor is determined by the switch and the operator in dependence on the lost-motion stroke.

5 Claims, 1 Drawing Figure

U.S. Patent
Jun. 30, 1987
4,676,700
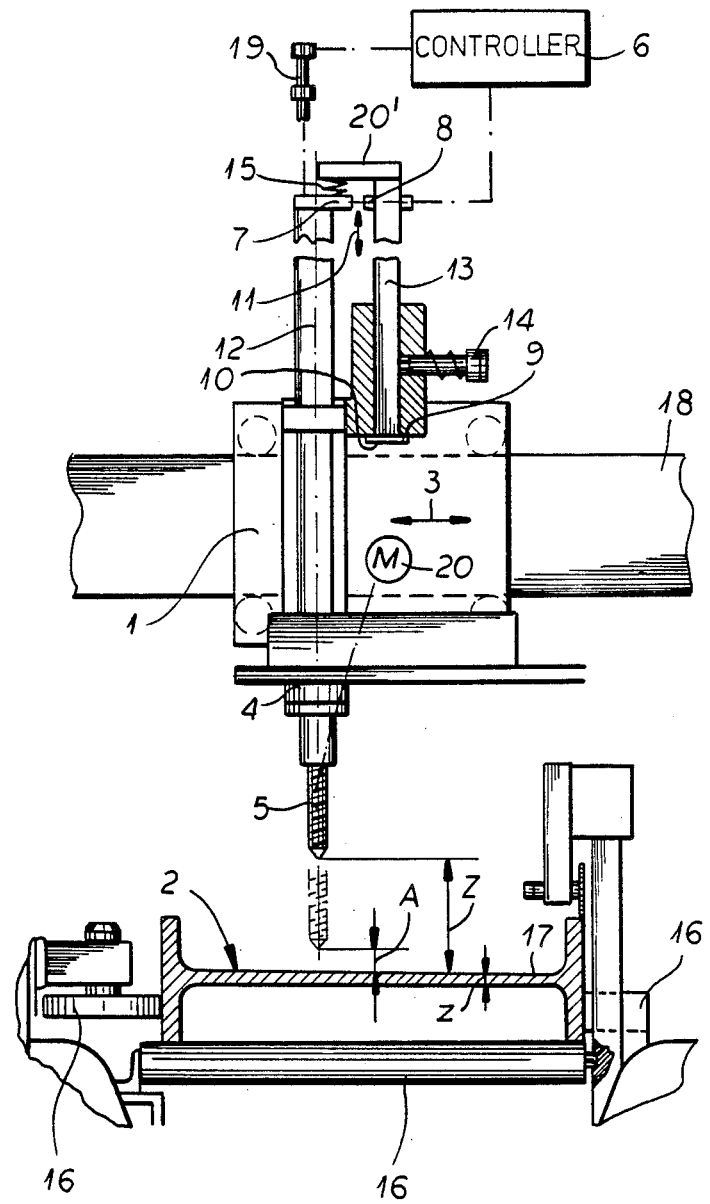

DRILLING APPARATUS FOR BORING AN ARRAY OF HOLES IN A WORKPIECE

FIELD OF THE INVENTION

The present invention relates to an apparatus for boring a plurality of holes in a workpiece. More particularly this invention concerns a production-line drill press which is moved around over a large stationary workpiece, for instance a piece of structural steel.

BACKGROUND OF THE INVENTION

A standard drilling apparatus of the type used to bore a plurality of holes in a workpiece, for instance in the web of a C- or I-beam, typically has a transverse support beam on which a drilling unit can move transversely of the workpiece, while this beam itself can move portal-fashion longitudinally of the workpiece. The support carries a vertically or horizontally displaceable arbor holding a drill bit that can move vertically or horizontally through a relatively long transverse stroke. The drill bit is rotated continuously and the actuator that moves the arbor and bit through this stroke normally advances the bit toward the workpiece and retracts it therefrom at a relatively fast speed, but only moves the bit at a relatively slow speed while the bit is actually boring.

As described in U.S. Pat. No. 4,108,564 the displacement of the arbor is typically controlled by a switch fixed relative to the arbor and operated by an actuator on the arbor. Thus the operator on the arbor can actuate the switch that controls the axial movement of the arbor and bit, for instance by restricting flow into or out of the actuating cylinder for this arbor.

An abutment and stop are provided that are operatively mounted on the arbor and drill bit to define the uppermost position of the arbor, that is its position furthest from the workpiece. The length of the stroke through which the drill bit and arbor are moved from this uppermost position to contact with the workpiece is normally somewhat long, so that the bit can be retracted enough to allow workpieces with fairly high parts to be moved under it.

When a succession of holes are to be bored in the workpiece, something which is fairly common when workpieces are being prepared for a prefabricated project, the drilling arbor is moved through its entire vertical stroke between successive boring operations. Even though the major portion of the stroke is carried out at relatively high speed this long up and down reciprocation takes up quite some time and generally slows the boring operation when such a succession of bores must be made.

OBJECTS OF THE INVENTION

It is therefore an object of the present invention to provide an improved drilling apparatus.

Another object is the provision of such a drilling apparatus which overcomes the above-given disadvantages, that is which moves quickly between successive bores formed in the same workpiece.

SUMMARY OF THE INVENTION

An apparatus for drilling a large profile workpiece according to the invention has a support fixable relative to the workpiece, a drill arbor centered on an axis intersecting the workpiece and displaceable therealong toward and away from the workpiece, a bit coaxially carried on the arbor and engageable with the workpiece, and a drive connected to the arbor for advancing the bit toward the workpiece either at a relatively fast advance speed or at a relatively slow boring speed. A guide element displaceable in the support parallel to the axis is secured by a link to the arbor for joint movement parallel to the axis with a predetermined limited lost-motion stroke, in other words, the arbor and element can only move relative to each other through this stroke. A control unit connected to the drive includes a switch carried on the element and a switch operator carried on the arbor for controlling axial movement of the arbor. This control unit also includes an abutment carried on the element and a stop on the support engageable with the abutment for defining an outer position for the guide element and arbor. Thus the guide element is prevented by engagement of the abutment on the stop from moving further away from the workpiece than the outer position. A clamping device is provided on the support for arresting the guide element thereon, to that, when the guide element is arrested on the support, the axial stroke of the arbor is determined by the switch and the operator in dependence on the lost-motion stroke.

According to this invention the arbor axis is vertical and the link is a compression spring braced between the element and the arbor. This spring is decompressed on motion of the arbor relative to the guide element through the lost-motion stroke. When the support and arbor are above the workpiece gravity helps the guide element follow downward movement of the arbor.

The advantage of the instant invention is that a plurality of bores can be drilled without raising the arbor and bit more than a short distance of 10 mm to 20 mm above the surface being drilled. This allows the time between successive drilling operations to be cut substantially, thereby cutting production time overall.

DESCRIPTION OF THE DRAWING

The above and other features and advantages will become more readily apparent from the following, reference being made to the accompanying drawing whose sole FIGURE is a partly diagrammatic vertical cross section through the drilling apparatus according to this invention.

SPECIFIC DESCRIPTION

As seen in the FIGURE a drilling apparatus according to the invention has a guide 16 for supporting an elongated workpiece, here an I-beam 2 having a horizontal web 17 extending longitudinally perpendicular to the plane of the view. The drilling apparatus itself is of the portal type, having a horizontal and transverse beam 18 above the workpiece 2 and a main support 1 displaceable transversely and horizontally on the beam 18 as indicated by double-headed arrow 3. Standard actuators operated by a controller 6 serve to position the support 1 transversely of the workpiece (from side to side as seen in the drawing) while further actuators can displace the portal beam 18 longitudinally of the workpiece to bore any desired array of holes.

The drill support 1 carries an arbor 4 that is vertically and transversely displaceable along its axis 12 through a stroke Z relative to the upper surface of the workpiece web 17 by means of a hydraulic cylinder 19 operated by the controller 6. (It being of course obvious that this arrangement would function horizontally or from beneath the workpiece.) This arbor 4 carries a conventional drill bit 5 centered on the axis 12 and rotatable by a two-speed drive illustrated schematically at 20 and also operated by the controller 6. The height of the stroke Z is sufficient to allow the bit 5 to clear the flanges of the workpiece 2 and is many times greater than the thickness z of the web 17, which is the stroke through which the bit 5 moves to bore through the workpiece 2.

The changeover between fast advance of the arbor 4 and bit 5 by the cylinder 19 and slow advance is determined by the controller 6 which has a switch 8 which is normally fixed relative to the support 1 and which is actuated by an operating element 7 fixed on the upper end of the arbor 4.

The switch 8 is carried on a guide element 13 slidable parallel to the axis 12 in the main support 1 and arrestable therein by a clamping screw 14. The lower end of the guide rod 13 is provided with an abutment 9 in the form of an enlarged head and a lower surface of the support forms a stop 10 that engages the abutment 9 when the guide rod 13 is in its uppermost position. The upper end of the rod 13 carries a rigid outrigger arm 20' that overhangs the switch operator 7 at the upper end of the arbor 4 and that has an under surface to which is fixed the upper end of a coil-type spring 15 whose lower end is fixed to the upper surface of the operator 7. When the operator 7 comes immediately level with the switch 8 carried on the element 13, same is actuated. The spring 15 is unloaded, that is decompressed, as the arbor 4 moves downward from the illustrated position through a stroke 11 which also constitutes the relative degree of motion possible between the arbor 4 and element 13.

The system described above functions as follows:

First the workpiece 2 to be drilled is moved by the conveyor guide 16 into position underneath the support 1 which is appropriately positioned with the axis 12 centered on the location to be bored. The arbor 4 is pushed down out of the illustrated upper position toward the web 17 of the workpiece 2 until the bit 5 touches this workpiece 2.

During this downward motion the spring 15 is relaxed. The element 13 has also meanwhile moved toward the workpiece 2, gravity helping out in the illustrated vertical setup. As this happens the operator 7 moves away from the switch 8 through the stroke distance 11 largely determined by the spring 15. The clamp 14 is tightened to arrest the element 13 and the switchover from fast to slow advance of the arbor 4 is made. The hole is then drilled.

Once the boring operation is completed the arbor 4 moves back up until the operator 7 reaches the switch 8. This action compresses the spring 15. This has the effect of stopping the bit at a distance of about 15 mm above the workpiece 2 that corresponds to the freedom of movement 11. Now the workpiece 2 is moved or the support 1 is moved to relatively position the bit 5 and workpiece 2 and a new hole can be drilled. Once all the holes to be drilled in a single workpiece 2 are complete, the arbor 4 returns to its uppermost rest position which is shown in the drawing and which is established by the abutment 9 on the lower end of the element 13 and the stop 10 on the support 1. It is understood that the switch 8 as is normal effects the hydraulic actuators that power the various movements.

I claim:

1. An apparatus for drilling a large profile workpiece, the apparatus comprising:
   a support fixable relative to the workpiece;
   a drill arbor centered on an axis intersecting the workpiece and displaceable therealong toward and away from the workpiece;
   a bit coaxially carried on the arbor, rotatable about the axis, and axially engageable with the workpiece;
   drive means connected to the arbor for axially advancing the bit toward the workpiece and for axially retracting it back from the workpiece through a predetermined relatively long axial displacement;
   a guide element displaceable in the support adjacent the arbor parallel to the axis;
   a switch carried on the guide element;
   a switch operator carried on the arbor and alignable with the switch;
   link means coupling the element to the arbor for joint forward movement parallel to the axis and with limited relative movement of the arbor and element through a predetermined limited lost-motion stroke with the element following movement of the arbor only after movement of the arbor through this stroke and with the switch and switch operator being axially offset by this stroke on such relative movement, the lost-motion stroke being substantially shorter than the long axial displacement of the arbor on the support;
   control means connected to the drive means, switch, and switch operator for controlling axial movement of the arbor by stopping axial movement of the bit away from the workpiece when the switch and operator are aligned;
   an abutment carried on the element;
   stop means on the support engageable with the abutment for defining an outer position for the guide element and arbor, the guide element being prevented by engagement of the abutment on the stop means from moving further away from the workpiece than the outer position; and
   means on the support for arresting the guide element thereon, whereby, when the guide element is arrested on the support, the axial stroke of the arbor is determined by the switch and the operator in dependence on the lost-motion stroke.

2. The drilling apparatus defined in claim 1 wherein the arbor axis is vertical.

3. The drilling apparatus defined in claim 1 wherein the link means is a compression spring braced between the element and the arbor, the spring being decompressed on motion of the arbor relative to the guide element through the lost-motion stroke.

4. The drilling apparatus defined in claim 3 wherein the arbor axis is vertical and the support and arbor are above the workpiece.

5. An apparatus for drilling a large profile workpiece, the apparatus comprising:
   a support fixable relative to the workpiece;
   a drill arbor centered on an axis intersecting the workpiece and displaceable therealong toward and away from the workpiece;
   a bit coaxially carried on the arbor, rotatable about the axis, and axially engageable with the workpiece;
   a guide element axially displaceable in the support adjacent the arbor;
   a switch carried on the guide element;

a switch operator carried on the arbor and alignable with the switch;

link means including an axially entensible tension spring connected between the element and the arbor for joint axial forward movement and with limited relative movement of the arbor and element through a predetermined limited lost-motion stroke with the element following movement of the arbor only after movement of the arbor through this stroke and tensioning of the spring, the switch and switch operator being axially offset by this stroke on such relative movement and being aligned with the string is substantially relaxed, the lost-motion stroke being substantially shorter than the long axial displacement of the arbor on the support;

drive means connected to the arbor for axially advancing the bit toward the workpiece with the element being pulled axially via the spring by the arbor and for axially retracting the arbor back from the workpiece through a predetermined relatively long axial displacement;

control means connected to the drive means, switch, and switch operator for controlling axial movement of the arbor by stopping axial movement of the bit away from the workpiece when the switch and operator are aligned;

an abutment carried on the element;

stop means on the support engageable with the abutment for defining an outer position for the guide element and arbor, the guide element being prevented by engagement of the abutment on the stop means from moving further away from the workpiece than the outer position; and means on the support for arresting the guide element thereon, whereby, when the guide element is arrested on the support, the axial stroke of the arbor is determined by the switch and the operator in dependence on the lost-motion stroke.

* * * * *